(12) United States Patent  
Stelle et al.

(10) Patent No.: US 8,982,798 B2  
(45) Date of Patent: *Mar. 17, 2015

(54) DYNAMIC MULTI-POINT ACCESS NETWORK

(71) Applicant: CenturyLink Intellectual Property LLC, Denver, CO (US)

(72) Inventors: William T. Stelle, Lenaxa, KS (US); Kelsyn D. S. Rooks, Overland Park, KS (US); Jeffrey M. Sweeney, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/158,543

(22) Filed: Jan. 17, 2014

(65) Prior Publication Data

US 2014/0133405 A1  May 15, 2014

Related U.S. Application Data

(63) Continuation of application No. 12/469,183, filed on May 20, 2009, now Pat. No. 8,665,783.

(51) Int. Cl.
| | |
|---|---|
| H04W 4/00 | (2009.01) |
| H04L 12/911 | (2013.01) |
| H04L 12/725 | (2013.01) |
| H04W 40/24 | (2009.01) |
| H04L 12/729 | (2013.01) |
| H04L 12/707 | (2013.01) |
| H04W 40/00 | (2009.01) |

(52) U.S. Cl.
CPC ............ *H04L 47/828* (2013.01); *H04L 45/302* (2013.01); *H04W 40/24* (2013.01); *H04L 45/125* (2013.01); *H04L 45/24* (2013.01); *H04W 40/00* (2013.01)
USPC ............ 370/328; 370/401; 455/451; 709/240

(58) Field of Classification Search
None
See application file for complete search history.

(56) References Cited

U.S. PATENT DOCUMENTS

| | | | |
|---|---|---|---|
| 5,959,968 A | 9/1999 | Chin et al. | |
| 5,995,518 A | 11/1999 | Burns et al. | |
| 6,473,424 B1 | 10/2002 | DeJager et al. | |
| 6,667,975 B1 | 12/2003 | DeJager et al. | |
| 7,383,353 B2 | 6/2008 | Valdevit et al. | |
| 7,653,071 B1 * | 1/2010 | Pannell et al. | ................ 370/401 |
| 7,805,156 B1 * | 9/2010 | Allen et al. | ................ 455/550.1 |
| 8,665,783 B2 | 3/2014 | Stelle et al. | |

(Continued)

OTHER PUBLICATIONS

U.S. Appl. No. 12/464,477; Issue Notification dated Apr. 16, 2014; 1 page.

(Continued)

*Primary Examiner* — Khoa Huynh

(74) *Attorney, Agent, or Firm* — Swanson & Bratschun, L.L.C.

(57) ABSTRACT

A router is operatively coupled to a plurality of local computers and has one or more connections to a remote computer network for managing one or more data routes between the local computers and the remote computer network. In providing dynamic access to the remote computer network by any of the local computers, one or more of the connection(s) of the router to the remote computer network includes one or more wireless connections independent of the router between the local computers and the remote computer network.

26 Claims, 4 Drawing Sheets

(56) References Cited

U.S. PATENT DOCUMENTS

| | | | |
|---|---|---|---|
| 8,719,414 | B2 | 5/2014 | Rooks et al. |
| 2003/0046396 | A1 | 3/2003 | Richter et al. |
| 2004/0001512 | A1 | 1/2004 | Challener et al. |
| 2004/0024906 | A1 | 2/2004 | Valdevit et al. |
| 2004/0039834 | A1 | 2/2004 | Saunders et al. |
| 2006/0072543 | A1 | 4/2006 | Lloyd et al. |
| 2007/0064901 | A1 | 3/2007 | Baird et al. |
| 2007/0180119 | A1 | 8/2007 | Khivesara et al. |
| 2008/0250478 | A1 | 10/2008 | Miller et al. |
| 2008/0259841 | A1 | 10/2008 | Deshpande |
| 2009/0168701 | A1 | 7/2009 | White et al. |
| 2010/0177896 | A1 | 7/2010 | Walter et al. |
| 2010/0188990 | A1* | 7/2010 | Raleigh .................. 370/252 |
| 2010/0293277 | A1 | 11/2010 | Rooks et al. |
| 2010/0296437 | A1 | 11/2010 | Stelle et al. |

OTHER PUBLICATIONS

U.S. Appl. No. 12/464,477; Corrected Notice of Allowability dated Mar. 27, 2014; 3 pages.
U.S. Appl. No. 12/464,477; Final Office Action dated Mar. 13, 2012; 10 pages.
U.S. Appl. No. 12/464,477; Final Rejection dated Apr. 15, 2011; 25 pages.
U.S. Appl. No. 12/464,477; Final Rejection dated Jul. 29, 2013; 66 pages.
U.S. Appl. No. 12/464,477; Non-Final Office Action dated Oct. 6, 2011; 10 pages.
U.S. Appl. No. 12/464,477; Non-Final Rejection dated Nov. 17, 2010; 19 pages.
U.S. Appl. No. 12/464,477; Non-Final Rejection dated Dec. 24, 2012; 25 pages.
U.S. Appl. No. 12/464,477; Notice of Allowance dated Dec. 24, 2013; 55 pages.
U.S. Appl. No. 12/469,183; Advisory Action dated Sep. 11, 2013; 4 pages.
U.S. Appl. No. 12/469,183; Final Rejection dated Oct. 26, 2012; 21 pages.
U.S. Appl. No. 12/469,183; Final Rejection dated Jun. 21, 2013; 22 pages.
U.S. Appl. No. 12/469,183; Issue Notification dated Feb. 12, 2014; 1 page.
U.S. Appl. No. 12/469,183; Non Final Office Action dated Oct. 4, 2011; 14 pages.
U.S. Appl. No. 12/469,183; Non-Final Rejection dated Mar. 29, 2012; 22 pages.
U.S. Appl. No. 12/469,183; Non-Final Rejection dated Feb. 15, 2013; 22 pages.
U.S. Appl. No. 12/469,183; Notice of Allowance dated Oct. 17, 2013; 20 pages.

* cited by examiner

DYNAMIC MULTI-POINT ACCESS NETWORK

CROSS REFERENCE TO REALTED APPLICATION

This application is a continuation of U.S. patent application Ser. No. 12/469,183, filed May 20, 2009 by Stelle et al. and entitled, "Dynamic Multi-Point Access Network", which is hereby incorporated by reference in its entirety.

TECHNICAL FIELD OF THE INVENTION

The present invention generally relates to routers. The present invention specifically relates to creating an optimal aggregate bandwidth by a router from multiple broadband sources within a local computer network.

BACKGROUND OF THE INVENTION

A router is a device that forwards data packets between computer networks, and the amount of information per unit of time that can be exchanged between the router and another device is generally known as bandwidth. For example, in the context of a home or a business, a router may be utilized to forward data packets between a local computer and the Internet at a specified broadband transmission.

Multiple bandwidth sources of varying types may exist within a local computer network at any given time. In particular, a mobile phone or mobile data card in a computer may be added ad hoc to the local computer network and the router can aggregate all of its connected devices, wired and wireless, into a single bandwidth route to a remote computer network. The routing industry is striving to provide new and unique techniques for optimizing such aggregate bandwidth.

SUMMARY OF THE INVENTION

In one disclosed embodiment, a local computer network employing a plurality of local computers, and a router having one or more connections to a remote computer network is disclosed. These connection(s) provide for one or more data routes between the local computers and the remote computer network that are managed by the router. In providing for a dynamic access to the remote computer network by any of the local computers, one or more of the connection(s) of the router to the remote computer network includes one or more wireless connections between the local computers and the remote computer network that is independent of the router.

In another disclosed embodiment, a method of operating a router within a local computer network is disclosed. The method involves operatively coupling the router to a plurality of local computers, and connecting the router to a remote computer network for managing one or more data routes between the local computers and the remote computer network. In providing for a dynamic access to the remote computer network by any of the local computers, one of the connections of the router to the remote computer network includes one or more wireless connections between the local computers and the remote computer network that is independent of the router.

The foregoing embodiments and other embodiments of the present invention as well as various features and advantages of the present invention will become further apparent from the following detailed description of various embodiments of the present invention read in conjunction with the accompanying drawings. The detailed description and drawings are merely illustrative of the present invention rather than limiting, the scope of the present invention being defined by the appended claims and equivalents thereof.

DETAILED DESCRIPTION OF THE PREFERRED EMBODIMENTS

Figure 1:
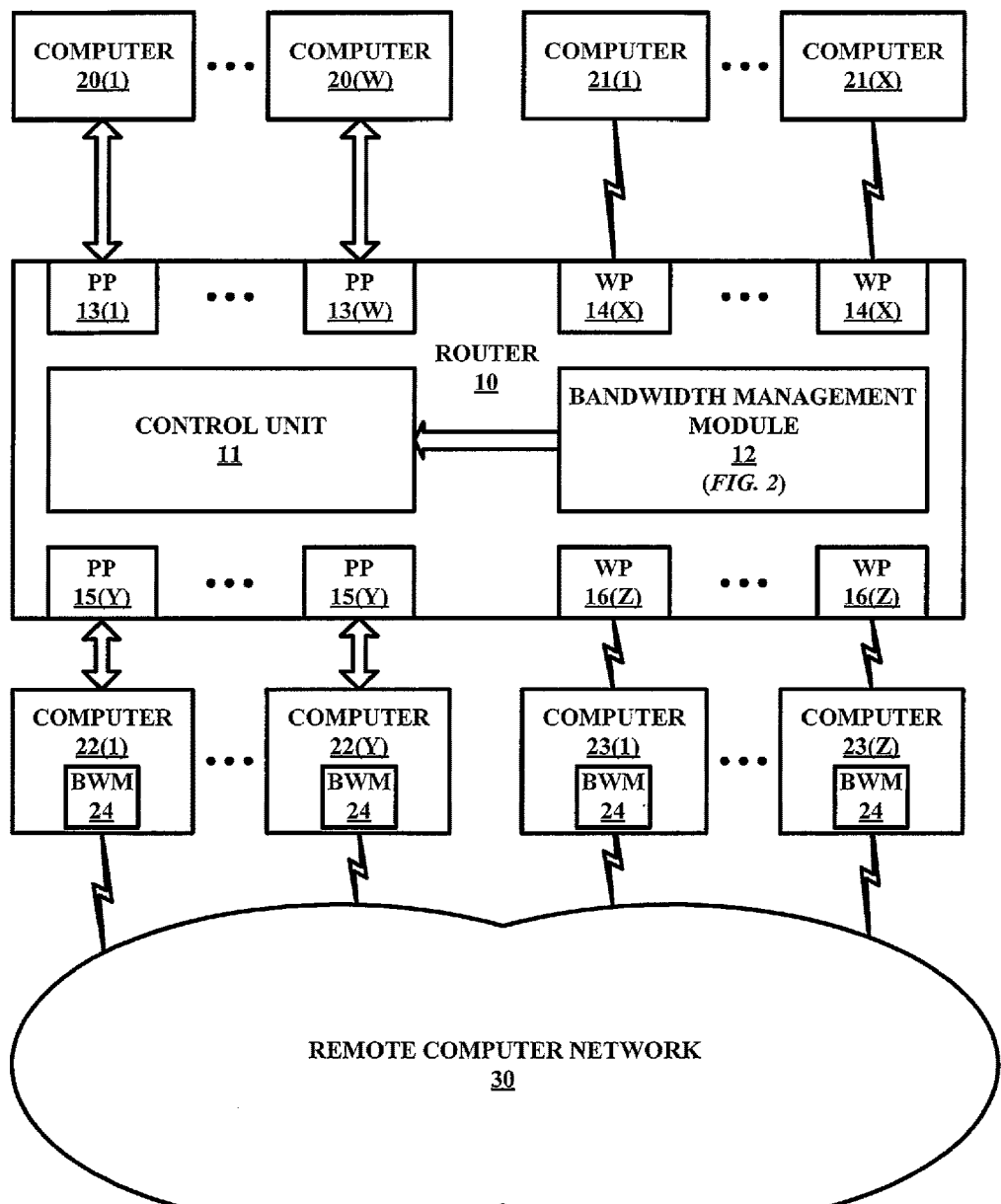
FIG. 1 illustrates a block diagram of an exemplary embodiment of a network environment in accordance with the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, and alterations and modifications in the illustrated devices and methods, and further applications of the principles of the invention as illustrated therein are herein contemplated as would normally occur to one skilled in the art to which the invention relates.

A router according to the presently disclosed embodiments incorporates common router features (e.g., routing tables, rules, protocols, firewalls, port forwarding, etc.) with a novel routing scheme involving dynamic access by a local computer network (e.g., a local area network or a wide area network) of which the router is a part to a remote computer network (e.g., a local area network or a wide area network) to which the router is remotely connected. In particular, the router combines all the available bandwidth from multiple connections to the remote computer network and allows access by the local computer network to the remote computer network on a selective allocation of the aggregate bandwidth. The dynamic access to the remote computer network is derived from the router using wireless connections of the local computer network independent of the router to the remote computer network. The following description of an exemplary router 10 of the present invention as shown in FIG. 1 and an exemplary routing method 40 of the present invention as shown in FIG. 2 will facilitate further understanding of the present invention.

Specifically, FIG. 1 illustrates router 10 having a W number of physical ports 13 for wired connections to a W number of computers 20 (e.g., desktops or servers), where W≥1, and an X number of wireless ports 14 for wireless connections to an X number of computers 21 (e.g., laptops), where X≥1. Alternatively, a portion or all of the wired and wireless connections may be to another computer network (e.g., an Ethernet). Additionally, router 10 has a Y number of physical ports 15 for wired connections to a Y number of computers 22 (e.g., desktops or servers), where Y≥1, and a Z number of wireless ports 16 for wireless connections to a Z number of computers 23 (e.g., laptops), where Z≥1.

In operation, router 10 implements a control unit 11 structurally configured to implement common router features (e.g., routing tables, rules, protocols, firewalls, port forwarding, etc.). A bandwidth management module 12 is incorporated in router 10, either within control unit 11 or working in conjunction with control unit 11, to execute flowchart 40 (FIG. 2) for the dynamic access between local computers 20-23 and remote computer network 30. Additionally, a bandwidth management module 24 is incorporated in each computer 23 to facilitate bandwidth management module 12 in executing flowchart 40.

Figure 2:
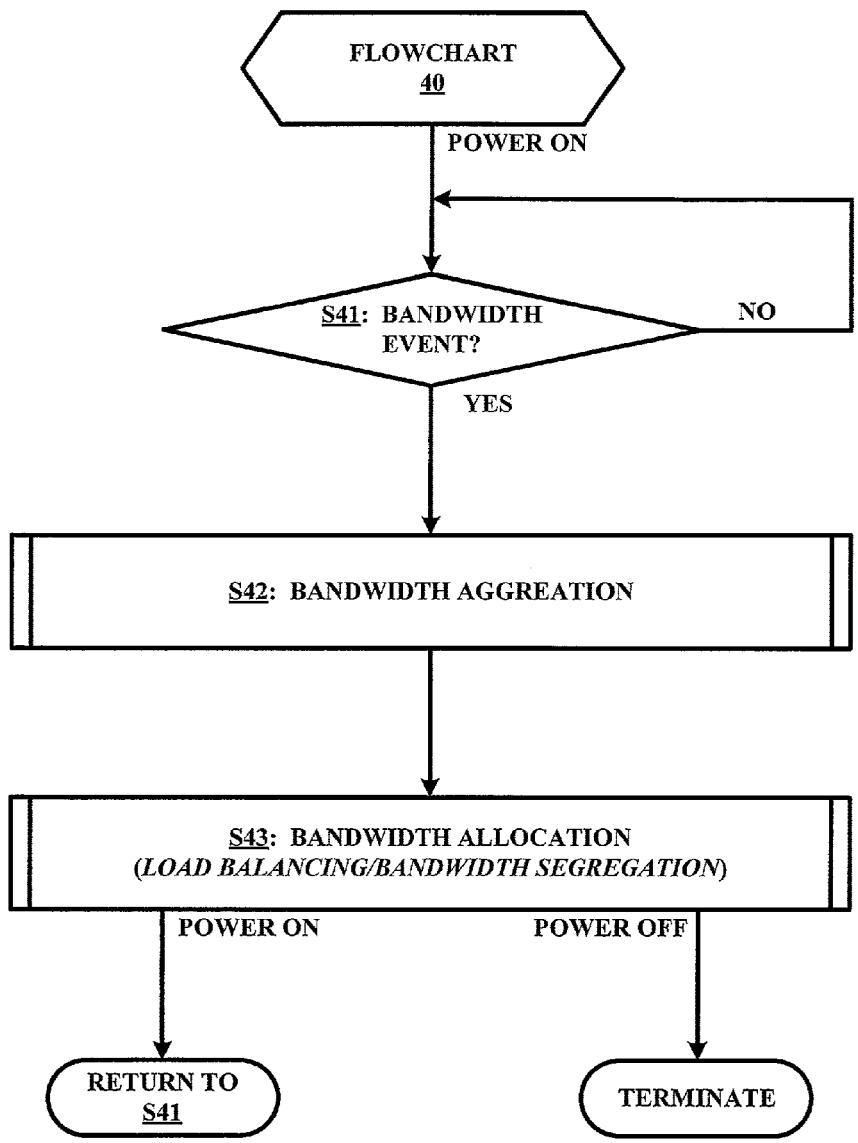
FIG. 2 illustrates a flowchart representative of an aggregate bandwidth method of the present invention.

Specifically, as shown in FIG. 2, module 12 during a stage S41 of flowchart 40 determines if a new connection between router 10 and remote computer network 30 has been established, if an existing connection between router 10 and remote computer network 30 has been terminated or if a bandwidth availability status of an existing connection between router 10 and remote computer network 30 has changed (collectively a "bandwidth event"). For the dynamic access scheme of the present invention, such connections include independent wireless connections between computers 22, 23 and remote computer network 30 as shown in FIG. 1 via any type of wireless network (e.g., a 3G network, a WiFi network and a WiMax network). In particular, module 12 communicates with a bandwidth module 24 incorporated within computers 22, 23 to determine the available bandwidth between the computers 22, 23 and the remote computer network 30 as well as the access parameters required for allowing module 12 to exchange data packets with remote computer network 30 via computers 23.

Upon making a determination of a bandwidth event, module 12 proceeds to a stage S42 of flowchart 40 to determine an aggregate bandwidth of all of the data routes between local computers 20-23 and remote computer network 30 (in some embodiments, module 12 aggregates multiple, but not all, available data routes). The aggregate bandwidth increases for a bandwidth event where a new connection between router 10 and remote computer network 30 has been established (e.g., a new wireless connection between a local computer 23 and remote compute network 30), and conversely decreases for a bandwidth event where an existing connection between router 10 and remote computer network 30 has been terminated (e.g., a disconnection of a wireless connection between a local computer 23 and remote computer network 30). Furthermore, the aggregate bandwidth is adjusted for a bandwidth event where the bandwidth availability of a connection between router 10 and remote computer network 30 has changed. This bandwidth aggregation of stage S42 enables computers 20-23 to operate as if they were all connected to a large bandwidth pipe while being unaware of the multiple data routes with remote computer network 30. As such, computers 23 may be coupled and decoupled to router 10 without any impact to the local computer network, because module 12 dynamically adjusts the size of the available bandwidth as needed.

Upon determining an aggregate bandwidth, module 12 proceeds to a stage S43 of flowchart 40 to allocate the aggregate bandwidth to local computers 20-23 as needed. Generally, module 12 ascertains which connections, particularly wireless connections, should be utilized in an exchange of data packets between local computers 20-23 and remote computer network 30.

In one allocation mode, module 12 executes a load balancing over a portion, if not all, of the available data routes. In another allocation mode, module 12 segregates the aggregate bandwidth into two or more independent bandwidth routes for the selective allocation of one of the bandwidth routes to each data exchange between local computers 20-23 and remote computer network 30. The segregation of the aggregate bandwidth by module 12 is based on one or more predetermined routing parameters that provide for an intelligent use of the aggregate bandwidth. Furthermore, a load balancing technique may be implemented for each bandwidth route including multiple connections to remote computer network 30. A more detailed explanation of stage S41 will now be provided herein with reference to FIG. 3 and FIG. 4.

Figure 3:
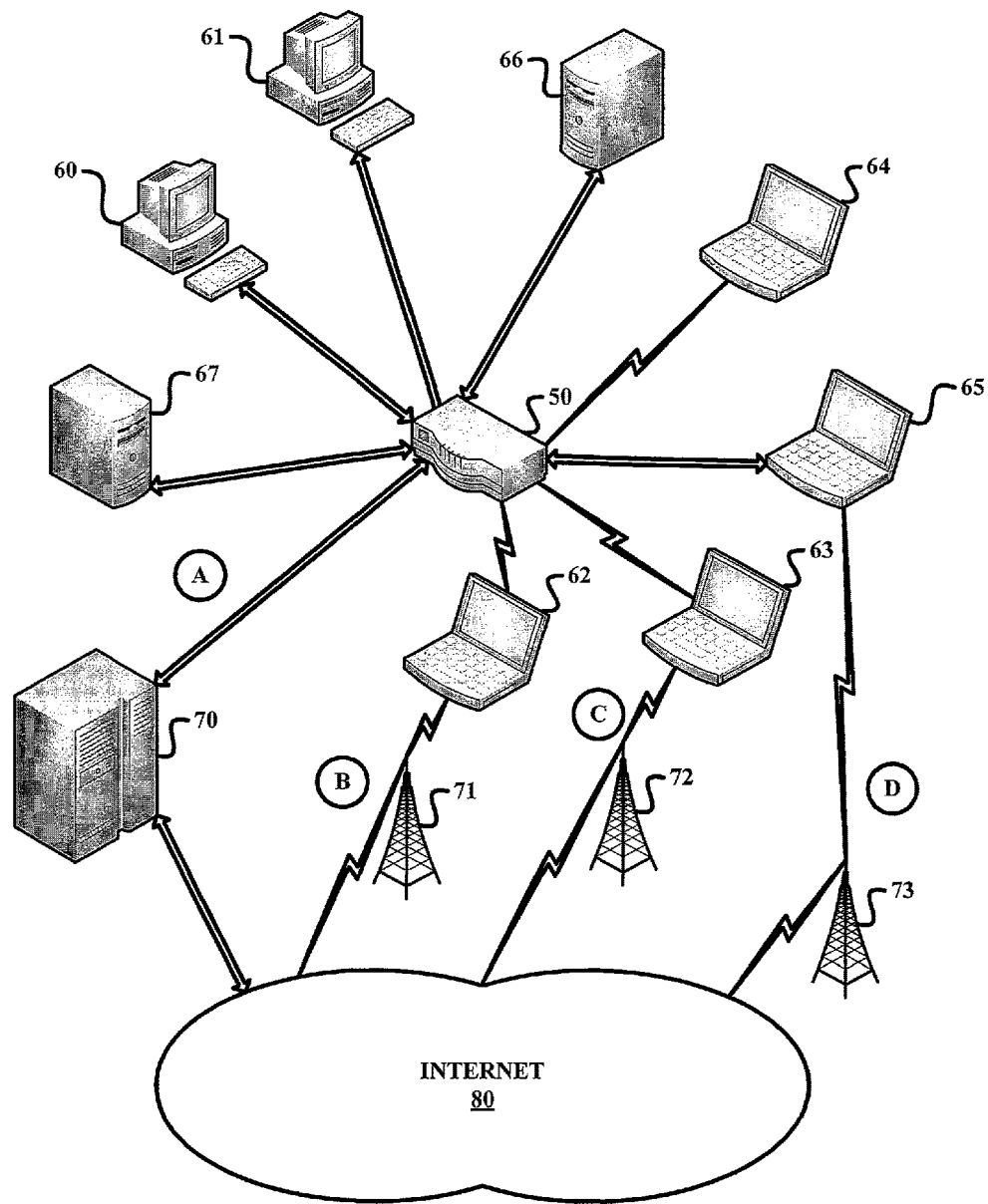
FIG. 3 illustrates a schematic diagram of a first exemplary embodiment of the network environment shown in FIG. 1 in accordance with the present invention.
Figure 4:
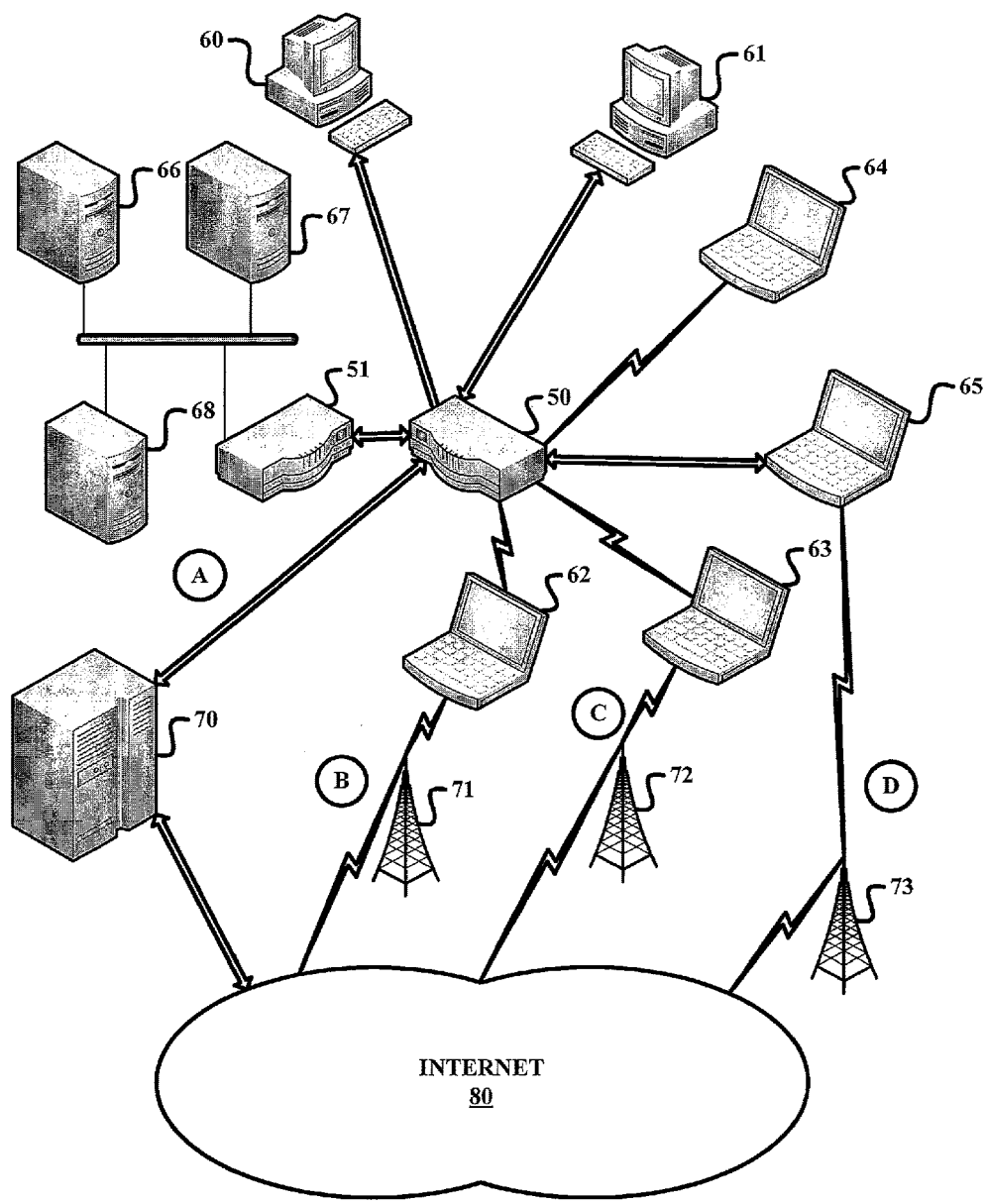
FIG. 4 illustrates a schematic diagram of a second exemplary embodiment of the network environment shown in FIG. 1 in accordance with the present invention.

Specifically, FIG. 3 illustrates a router 50 (having the same architecture as router 10) having wired connections to desktops 60 and 61, a laptop 65, and servers 66 and 67, and wireless connections to laptops 62-64. In an alternative embodiment, FIG. 4 illustrates servers 66-68 having a wired connection to a router 51, which has a router connection to router 50. Additionally, FIGS. 3 and 4 illustrate a wired connection to Internet 80 via an Internet service provider 70 having a bandwidth A, a wireless connection by laptop 62 to Internet 80 via an AirCard of laptop 62 and a wireless network 71 (e.g., a 3G network) having a bandwidth B, a wireless connection by laptop 63 to Internet 80 via an AirCard of laptop 63 and a wireless network 72 (e.g., a WiFi network) having a bandwidth C, and a wireless connection to Internet 80 via an AirCard of laptop 65 and wireless network 73 (e.g., a WiMax network) having a bandwidth D. The connections have an aggregate bandwidth A-D. Computers 60, 61, 64, 66 and 67 have no direct connection to internet 80. In one example, bandwidth B is 10 Mbps, bandwidth C is 2 Mbps and bandwidth D is 5 Mbps for a total bandwidth of 18 Mbps for the wireless connections that may shared along with wired bandwidth A by all of the local computers coupled to the router.

In order to accomplish this sharing of bandwidth by the local computers coupled to router 50, each of the computers having an external connection to internet 80 are provided with software that enables them to share with router 50 information about the currently-available bandwidth and access parameters that the router 50 will use to aggregate the total available bandwidth and make it available to all of the computers coupled to router 50. This bandwidth is made available as a single connection, such that the devices in the network only need to be aware of the single connection to internet 80 provided by the router 50, and would not need to be aware of the total number of actual connections to internet 80, which number can be dynamically changing while any of the network devices are communicating with internet 80.

Referring to FIGS. 3 and 4, for load balancing purposes, module 12 will utilize the aggregate bandwidth A-D as needed to exchange data packets between the local computers and Internet 80. The dynamic nature of laptops 62, 63 and 65 being connected or disconnected from router 50 and Internet 80 at any given moment in time as well as the dynamic nature of additional laptops being connected to or disconnected from router 50 and Internet 80 at any given moment in time is constantly being monitored by router 50 to ensure a complete and accurate data exchange between router 50 and Internet 80.

Still referring to FIGS. 3 and 4, for bandwidth segregation purposes, one routing parameter that may be utilized by module 12 in segregating aggregate bandwidth A-D may be the type of connection between router 50 and Internet 80. For example, module 12 may segregate the aggregate bandwidth A-D into a wired bandwidth route A for the wired connection between router 50 and Internet 80, and a wireless bandwidth route B-D for the wireless connections between router 50 and Internet 80. A load balancing technique may be implemented for wireless bandwidth route B-D.

Another routing parameter that may be utilized by module 12 in segregating aggregate bandwidth A-D may be the type of connection between router 50 and the local computers. For example, as shown in FIG. 3, module 12 may segregate the aggregate bandwidth A-D into a wired bandwidth route A for the wired connections between router 50 and computers 60, 61 and 65-67, and a wireless bandwidth route B-D for the wireless connections between router 50 and computers 62-64. Also by example, as shown in FIG. 4, module 12 may segregate the aggregate bandwidth A-D into a wired bandwidth route A for the wired connections between router 50 and computers 60, 61 and 65 and router 51, and a wireless bandwidth route B-D for the wireless connections between router 50 and computers 62-64.

Another routing parameter that may be utilized by module 12 in segregating aggregate bandwidth A-D may be the mode of connection between router 50 and the computers. For example, as shown in FIG. 4, module 12 may segregate the aggregate bandwidth A-D into a direct bandwidth route A for the direct connections between router 50 and computers 60-65, and a switch bandwidth route B-D for the connections between router 50 and router 51.

Another routing parameter that may be utilized by module 12 in segregating aggregate bandwidth A-D may be the latency of the data routes. For example, module 12 may segregate the aggregate bandwidth A-D into a low latency bandwidth route A for each data exchange of video, audio and/or images between router 50 and Internet 80, and a high latency bandwidth route B-D for each data exchange of text and/or database data between router 50 and Internet 80.

Another routing parameter that may be utilized by module 12 in segregating aggregate bandwidth A-D may be the directional flow of data between router 50 and Internet 80. For example, module 12 may segregate the aggregate bandwidth A-D into an upstream bandwidth route A for upstream data exchange from router 50 to Internet 80, and a downstream bandwidth route B-D for each downstream data exchange from Internet 80 to router 50.

Another routing parameter that may be utilized by module 12 in segregating aggregate bandwidth A-D may be the desired security level of the data exchange between router 50 and Internet 80. For example, module 12 may segregate the aggregate bandwidth A-D into a bandwidth route A-B for secure data exchange between router 50 and Internet 80, and a bandwidth route C-D for each unsecure data exchange between router 50 and Internet 80.

Another routing parameter that may be utilized by module 12 in segregating aggregate bandwidth A-D may be the security level of each connection between router 50 and Internet 80. For example, module 12 may segregate the aggregate bandwidth A-D into a bandwidth route A-B for secure connections between router 50 and Internet 80, and a bandwidth route C-D for unsecure connections between router 50 and Internet 80.

Referring again to FIG. 2, module 12 will continually execute stages S41-43 of flowchart 40 until such time router 10/50 is powered off. In practice, module 12 may be implemented in hardware, firmware and/or software as would be appreciated by those having ordinary skill in the art. Furthermore, module 12 may provide an administrator control panel to enable a customization of routing and access restrictions. For example, the control panel can enable an administrator to define which local computers may or may not functions as access points to the network or, alternatively, to allow any local computer to function as an access point. In cases where specific access devices are identified, the control panel can connect to the wireless service provider account to track the overall usage (both while connected and unconnected to the router 10/50) of each local computer and to set rules to control the amount of bandwidth that is consumed by the local computer network based on the wireless rate plan and/or other business rules. The control panel can additionally define routing requirements for specific types of data traffic. For example, the control panel may specify that encrypted data traffic will only be routed over secure connections, etc. The control panel may further enable quality of service control, such as providing the ability to test the latency of each connection, and having programming instructions that route specific types of data traffic over specific connections depending upon the requirements of the data traffic.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A local computer network, comprising:
a plurality of local computers comprising a first group of local computers and a second group of local computers; and
a router operatively coupled to the local computers and having at least one connection to a remote computer network for managing at least one data route between the local computers and the remote computer network, and having a direct connection with an internet service provider,
wherein the first group of local computers is connected with the remote computer network through the router;
wherein the second group of local computers is connected with the remote network through wireless connections that are independent of the router;
wherein the router receives from at least one of the second group of local computers information about available bandwidth over at least one of the wireless connections available through the at least one of the second group of computers and access parameters for the at least one of the wireless connections, the router utilizing the at least one of the wireless connections to enhance the connection between the first group of local computers and the remote computer network, determining a bandwidth event and, in response to determining the bandwidth event, determining an aggregate bandwidth of the direct connection with the internet service provider and the at least one of the wireless connections and allocating the aggregate bandwidth to the local computers as needed.

2. The local computer network of claim 1, wherein at least one of the local computers in the second group of local computers communicates to the router information regarding the wireless connection between said at least one of the local computers in the second group of local computers and the remote computer network.

3. The local computer network of claim 2, wherein said information comprises an available bandwidth of the wireless connection.

4. The local computer network of claim 2, wherein said information comprises access parameters of the wireless connection.

5. The local computer network of claim 1, wherein the router segregates the aggregate bandwidth into at least two independent bandwidth routes for selective allocation of one of the bandwidth routes to each data exchange between the plurality of local computers and the remote computer network.

6. The local computer network of claim 5, wherein the at least two independent bandwidth routes include:

a wired bandwidth route including each wired connection between the router and the remote computer network; and a wireless bandwidth route including each connection between the router and the remote computer network including a wireless link.

7. The local computer network of claim 5, wherein the at least two independent bandwidth routes include:

a wired bandwidth route including each wired connection between the router and the plurality of computers; and a wireless bandwidth route including each wireless connection between the router and the plurality of computers.

8. The local computer network of claim 5, wherein the at least two independent bandwidth routes include:

a secure bandwidth route for each secure data exchange between the local computer network and the remote computer network; and an unsecured bandwidth route for each unsecured data exchange between the local computer network and the remote computer network.

9. The local computer network of claim 5, wherein the at least two independent bandwidth routes include:

a low latency bandwidth route for each data exchange of a first type of data packet between the local computer network and the remote computer network; and a high latency bandwidth route for each data exchange of a second type of data packet between the local computer network and the remote computer network.

10. The local computer network of claim 1, wherein the router includes a control panel allowing a user to define which ones of said plurality of local computers may provide said at least one connection.

11. The local computer network of claim 10, wherein said control panel allows said user to connect to the service provider account of said at least one wireless connection to receive information therefrom.

12. The local computer network of claim 11, wherein said information comprises usage data.

13. The local computer network of claim 11, wherein said information comprises rate information.

14. A method of operating a router for a local computer network including a plurality of computers coupled to the router, the method comprising:

operatively coupling the router to the plurality of local computers, wherein the plurality of local computers comprises a first group of local computers and a second group of local computers, wherein the first group of local computers is connected with a remote computer network through the router, wherein the second group of local computers is connected with the remote computer network through wireless connections that are independent of the router;

connecting the router directly to an internet service provider; and managing, at the router, at least one data route between the local computers and the remote computer network;

receiving, with the router and from at least one of the second group of local computers, information about available bandwidth over at least one of the wireless connections available through the at least one of the second group of computers and access parameters for the at least one of the wireless connections;

utilizing, with the router, the at least one of the wireless connections to enhance the connection between the first group of local computers and the remote computer network;

determining, with the router, a bandwidth event;

in response to determining the bandwidth event, determining with the router an aggregate bandwidth of a direct connection with the internet service provider and the at least one of the wireless connections and allocating the aggregate bandwidth to the local computers as needed.

15. The method of claim 14, further comprising:

at least one of the computers in the second group of local computers communicating to the router information regarding the wireless connections between said at least one of the computers in the second group of local computers and the remote computer network.

16. The method of claim 15, wherein said information comprises an available bandwidth of the wireless connection.

17. The method of claim 15, wherein said information comprises access parameters of the wireless connection.

18. The method of claim 14, further comprising:

operating the router to segregate the aggregate bandwidth into at least two independent bandwidth routes for selective allocation of one of the bandwidth routes to each data exchange between the plurality of local computers and the remote computer network.

19. The method of claim 18, wherein the at least two independent bandwidth routes include:

a wired bandwidth route including each wired connection between the router and the remote computer network; and a wireless bandwidth route including each wireless connection between the router and the remote computer network.

20. The method of claim 18, wherein the at least two independent bandwidth routes include:

a wired bandwidth route including each wired connection between the router and the plurality of local computers; and a wireless bandwidth route for each wireless connection between the router and the plurality of local computers.

21. The method of claim 18, wherein the at least two independent bandwidth routes include:

a secure bandwidth route for each secure data exchange between the local computer network and the remote computer network; and an unsecured bandwidth route for each unsecured data exchange between the local computer network and the remote computer network.

22. The method of claim 18, wherein the at least two independent bandwidth routes include:

a low latency bandwidth route for each data exchange of a first type of data packet between the local computer network and the remote computer network; and a high latency bandwidth route for each data exchange of a second type of data packet between the local computer network and the remote computer network.

23. The method of claim 14, further comprising:

the router displaying a control panel allowing a user to define which ones of said plurality of local computers may provide said at least one connection.

24. The method of claim 23, wherein said control panel allows said user to connect to the service provider account of said at least one of the wireless connections to receive information therefrom.

25. The method of claim 24, wherein said information comprises usage data.

26. The method of claim 24, wherein said information comprises rate information.

* * * * *